United States Patent
Sahota et al.

(10) Patent No.: US 10,409,704 B1
(45) Date of Patent: Sep. 10, 2019

(54) SYSTEMS AND METHODS FOR RESOURCE UTILIZATION REPORTING AND ANALYSIS

(71) Applicant: Dell Software Inc., Aliso Viejo, CA (US)

(72) Inventors: Paul Sahota, Toronto (CA); Stuart Hodgins, Toronto (CA)

(73) Assignee: Quest Software Inc., Aliso Viejo, CA (US)

(*) Notice: Subject to any disclaimer, the term of this patent is extended or adjusted under 35 U.S.C. 154(b) by 485 days.

(21) Appl. No.: 14/875,136

(22) Filed: Oct. 5, 2015

(51) Int. Cl.
  *G06F 9/445* (2018.01)
  *G06F 11/30* (2006.01)
  *G06F 11/34* (2006.01)

(52) U.S. Cl.
  CPC ...... *G06F 11/3409* (2013.01); *G06F 9/44505* (2013.01); *G06F 11/3024* (2013.01)

(58) Field of Classification Search
  CPC .............. G06F 11/3409; G06F 9/44505; G06F 11/3024
  See application file for complete search history.

(56) References Cited

U.S. PATENT DOCUMENTS

| | | | |
|---|---|---|---|
| 7,451,210 B2* | 11/2008 | Gupta .................. | G06F 11/008 709/223 |
| 7,979,245 B1 | 7/2011 | Bourlatchkov et al. | |
| 8,175,863 B1 | 5/2012 | Ostermeyer et al. | |
| 8,838,940 B2 | 9/2014 | Tene et al. | |
| 9,154,398 B1* | 10/2015 | Shpilyuck ............... | H04L 43/16 |
| 2002/0143929 A1* | 10/2002 | Maltz .................. | H04L 41/0213 709/224 |
| 2011/0107344 A1* | 5/2011 | Kim ...................... | G06F 9/5088 718/105 |
| 2012/0137295 A1 | 5/2012 | Soetemans et al. | |
| 2014/0324862 A1* | 10/2014 | Bingham .......... | G06F 17/30572 707/737 |
| 2016/0202172 A1* | 7/2016 | Guck ................. | G06K 9/00885 435/34 |

\* cited by examiner

*Primary Examiner* — Emerson C Puente
*Assistant Examiner* — Jonathan R Labud
(74) *Attorney, Agent, or Firm* — Winstead PC

(57) ABSTRACT

In an embodiment, a method includes receiving time-series data related to individual utilization rates of a plurality of central processing unit (CPU) cores. The method also includes, responsive to a trigger, transforming at least a portion of the individual utilization rates into a compressed value format, the transforming comprising: determining, from at least a portion of the time-series data, CPU-core utilization values of the plurality of CPU cores for a time constraint; evaluating the CPU-core utilization values against a preconfigured set of non-overlapping value ranges; responsive to the evaluating, determining a quantity of the CPU-core utilization values that correspond to each non-overlapping value range of the preconfigured set of non-overlapping value ranges; and generating a CPU-core utilization snapshot comprising the determined quantity of each non-overlapping value range of the preconfigured set of non-overlapping value ranges.

20 Claims, 4 Drawing Sheets

SYSTEMS AND METHODS FOR RESOURCE UTILIZATION REPORTING AND ANALYSIS

BACKGROUND

Technical Field

The present disclosure relates generally to performance monitoring and more particularly, but not by way of limitation, to systems and methods for resource utilization reporting and analysis.

History of Related Art

In information technology (IT) management, performance data may be collected from numerous sources using numerous disparate data formats. Integrating such data can be computationally expensive due to the significant amount of processing involved.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In an embodiment, a method is performed by a computer system. The method includes receiving time-series data related to individual utilization rates of a plurality of central processing unit (CPU) cores. The method also includes, responsive to a trigger, transforming at least a portion of the individual utilization rates into a compressed value format, the transforming comprising: determining, from at least a portion of the time-series data, CPU-core utilization values of the plurality of CPU cores for a time constraint; evaluating the CPU-core utilization values against a preconfigured set of non-overlapping value ranges; responsive to the evaluating, determining a quantity of the CPU-core utilization values that correspond to each non-overlapping value range of the preconfigured set of non-overlapping value ranges; and generating a CPU-core utilization snapshot comprising the determined quantity of each non-overlapping value range of the preconfigured set of non-overlapping value ranges.

In an embodiment, an information handling system includes a processor. The processor is operable to implement a method. The method includes receiving time-series data related to individual utilization rates of a plurality of central processing unit (CPU) cores. The method also includes, responsive to a trigger, transforming at least a portion of the individual utilization rates into a compressed value format, the transforming comprising: determining, from at least a portion of the time-series data, CPU-core utilization values of the plurality of CPU cores for a time constraint; evaluating the CPU-core utilization values against a preconfigured set of non-overlapping value ranges; responsive to the evaluating, determining a quantity of the CPU-core utilization values that correspond to each non-overlapping value range of the preconfigured set of non-overlapping value ranges; and generating a CPU-core utilization snapshot comprising the determined quantity of each non-overlapping value range of the preconfigured set of non-overlapping value ranges.

In an embodiment, a computer-program product includes a non-transitory computer-usable medium having computer-readable program code embodied therein. The computer-readable program code is adapted to be executed to implement a method. The method includes receiving time-series data related to individual utilization rates of a plurality of central processing unit (CPU) cores. The method also includes, responsive to a trigger, transforming at least a portion of the individual utilization rates into a compressed value format, the transforming comprising: determining, from at least a portion of the time-series data, CPU-core utilization values of the plurality of CPU cores for a time constraint; evaluating the CPU-core utilization values against a preconfigured set of non-overlapping value ranges; responsive to the evaluating, determining a quantity of the CPU-core utilization values that correspond to each non-overlapping value range of the preconfigured set of non-overlapping value ranges; and generating a CPU-core utilization snapshot comprising the determined quantity of each non-overlapping value range of the preconfigured set of non-overlapping value ranges.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Resource utilization can be an important performance metric in systems management. An example is central processor unit (CPU) utilization. With the ubiquity of multi-core CPUs and virtual environments, storing, transmitting and interpreting metrics for individual CPU cores can be cumbersome, and using an aggregate (e.g. average) metric for CPU utilization often results in important domain-specific data being lost.

The present disclosure describes examples of tracking utilization of resources using preconfigured sets of value ranges. In certain embodiments, the utilization-value ranges of a given preconfigured set can correspond to a non-overlapping ranges of utilization values.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
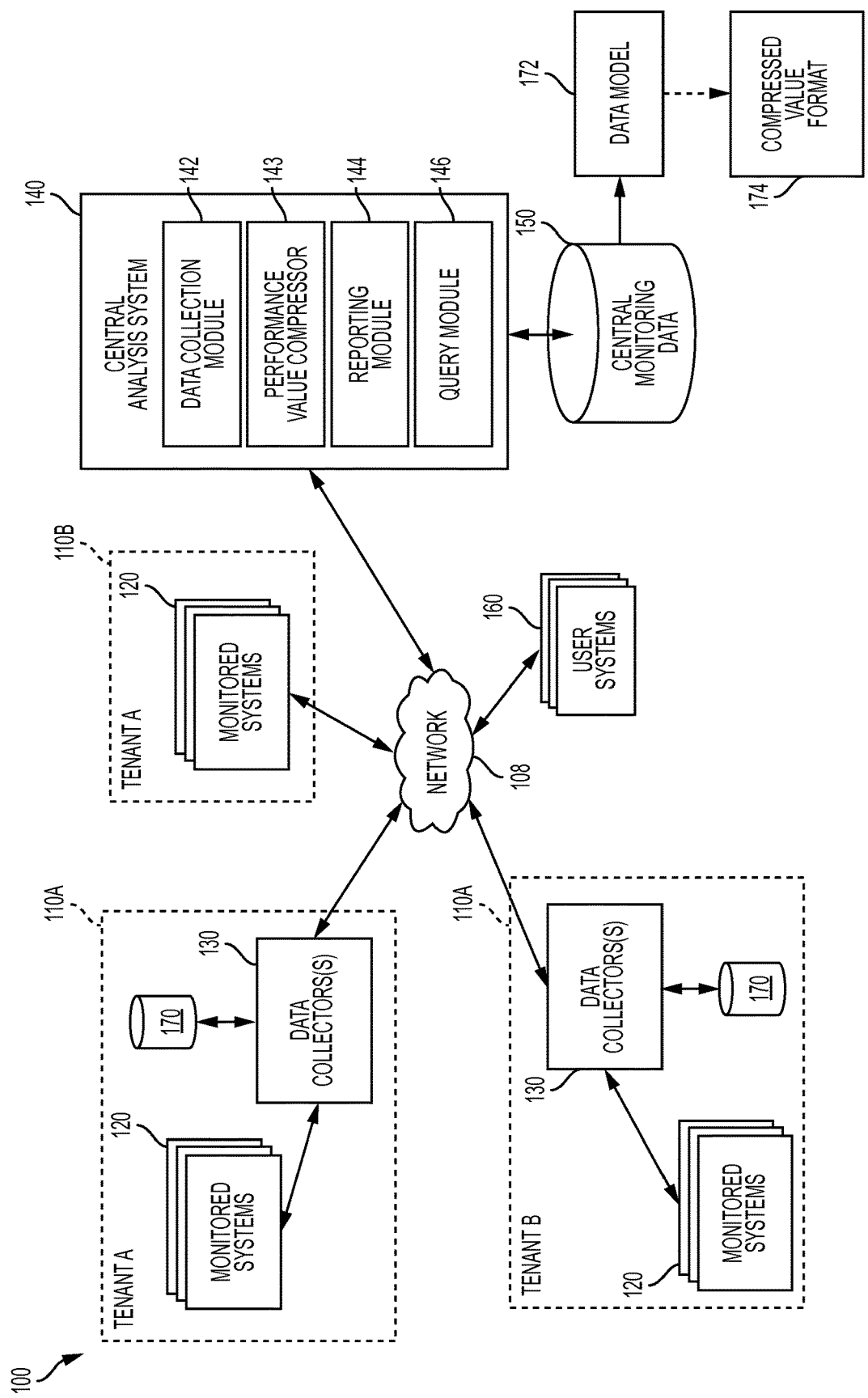
FIG. 1 illustrates an example computing environment.

FIG. 1 illustrates an example computing environment 100 for implementing a central analysis system 140. In the computing environment 100, tenant systems 110 connect to the central analysis system 140 over a network 108, which may be a private network, a public network, a local or wide area network, the Internet, combinations of the same, or the like. Each of the tenant systems 110 can represent an installation of physical and/or virtual computing infrastructure. In general, the tenant systems 110 can provide various types of monitoring data to the central analysis system 140, including, for example, performance data (e.g., performance metrics) and system configuration data.

The tenant systems 110 shown can be owned or operated by the same or different entities. For example, two of the tenant systems 110 installed in separate locations are shown as owned or operated by "Tenant A," while another system 110 is owned or operated by a different tenant, "Tenant B." Tenants A and B can represent customers (e.g., entities such as companies or individuals) of an operator of the central analysis system 140. Although the term "tenant" is used herein to describe the systems 110 or owners/operators thereof, in addition to having its ordinary meaning, the term "tenant" can, but need not, refer to tenancy in a multitenant software architecture.

Each of the tenant systems 110 includes one or more monitored systems 120. The monitored systems 120 can include physical and/or virtual computing devices, such as physical machines and/or virtual machines. For instance, a monitored system 110 may include any of the following: an information handling system, a virtual machine, server, web server, application server, database, application, processor, memory, hard drive or other storage device, peripheral, software component, database tables, tablespaces in a database, application tiers, network switches or other network hardware, combinations of the same or the like. Any given tenant system 110 can include from one to several monitored systems 120. For example, a tenant system 110 can represent an entire data center having hundreds or even thousands of monitored systems 120.

Data collectors 130 and local data stores 170 can be provided in some or all of the tenant systems 110. In the depicted embodiment, data collectors 130 and local data stores 170 are shown in a pair of the tenant systems 110A. No data collector 130 or local data store 170 is provided in one of the tenant systems 110B, which tenant can be an example of a data collection module 142 of the central analysis system 140 in some cases directly collecting monitoring data from the monitored systems 120.

The data collectors 130 can be software and/or hardware agents, appliances, or the like that collect monitoring data about the monitored systems 120. This monitoring data can include time-series data related to the performance of physical and/or software components (including virtual components), such as performance related to any of the monitored systems 120 described above. The monitoring data can also include information about attributes, characteristics, or properties of the monitored systems 120, such as the number of processors in each host device, memory or storage capacity, hardware or software specifications, virtual machine characteristics, and so forth. The data collectors 130 can collect this monitoring data in real-time, periodically, e.g., according to a schedule, on-demand, or a combination of the same, and store the monitoring data in the local data stores 170. In some tenant system 110 installations having many monitored systems 120, one or more management servers (not shown) can manage data collection of a plurality of data collectors 130.

As mentioned above, the data collectors 130 can store the collected monitoring data in the local data stores 170. In addition, the data collectors 130 can provide the collected monitoring data to the central analysis system 140 upon request, or, in some cases, as a live stream. Other tenant systems 110 that do not have local data collectors 130, such as the tenant system 110B, can provide monitoring data directly to the central analysis system 140. The central analysis system 140, or more specifically the data collection module 142, can access this data remotely by querying libraries or APIs of the tenant systems 110B, thereby replacing the functionality of the data collectors 130 in some embodiments. More generally, in other embodiments, local data collectors 130 or other agents may be omitted, or each tenant system 110 can include one or more data collectors 130.

For smaller computing environments, the central analysis system 140 can be implemented as a single management server. Alternatively, the central analysis system 140 can be implemented in a plurality of virtual or physical servers, which may or may not be geographically co-located. For example, the central analysis system 140 and/or other aspects of the computing environment 100 may be hosted in a cloud-based hosting service such as the Azure™ service provided by Microsoft® or the EC2™ platform provided by Amazon®.

Example implementations for collecting data using agents and management servers is described in the following U.S. Patents and Applications, each of which is hereby incorporated by reference in its entirety: U.S. Pat. No. 7,979,245, filed May 16, 2007, titled "Model-Based Systems and Methods for Monitoring Computing Resource Performance," ("the '245 patent") and U.S. application Ser. No. 12/370,399 ("the '399 application"). The central analysis system 140 and data collectors 130 can implement some or all of the features described in the '245 patent and the '399 application.

In certain embodiments, the central data store 150 implements a data model 172. The data model 172 can be, for example, a topology model that represents computer systems and components as interrelated topology objects. Examples of topology models are described in the '245 patent and the '399 application. The data model 172 typically provides a common representation of, and a single point of reference for, monitoring data collected in the computing environment 100. For example, the data model 172 can specify, inter alia, a structure of each element of monitoring data the central analysis system 140 is operable to receive. As illustrated, the data model 172 can implement a compressed value format 174 with respect to at least some of the monitoring data.

The compressed value format 174 can define configurable sets of non-overlapping value ranges. In various cases, a set of non-overlapping value ranges can be defined for particular types of monitoring data. In an example, a set of non-overlapping ranges can be defined for utilization of a resource such as monitored system or a component of a monitored system. According to this example, the set of non-overlapping ranges could correspond to divisions of zero to one-hundred percent, inclusive. By way of more particular example, a set of non-overlapping ranges could be defined for CPU utilization by CPU cores of a computer system or a combination of computer systems. According to this example, non-overlapping ranges could be defined as follows: zero percent, greater than zero percent but less than or equal to twenty percent, greater than twenty percent but less than or equal to eighty percent, greater than eighty percent but less than one-hundred percent, and one-hundred percent. It should be appreciated that non-overlapping ranges can also be configured or established in other ways.

In the depicted embodiment, the central analysis system 140 includes the data collection module 142, a performance value compressor 143, a reporting module 144, and a query module 146. Each of these components can be implemented with hardware and/or software, including (optionally) virtual machines. In an example, the central analysis system 140 can be implemented as a single management server. In another example, the central analysis system 140 can be implemented in a plurality of virtual or physical servers, which may or may not be geographically co-located. For instance, the central analysis system 140 and/or other aspects of the computing environment 100 may be hosted in a cloud-based hosting service such as the Azure™ service provided by Microsoft® or the EC2™ platform provided by Amazon®.

As described above, the data collection module 142 can, in some cases, collect monitoring data directly from the monitored systems 120 (e.g., using web service calls or other remote procedure calls) for storage in the central data store 150. The performance value compressor 143 can develop compressed representations of at least a portion of the monitoring data in conformance to the compressed value format 174. For example, in certain embodiments, the performance value compressor 143 can develop compressed representations of resource utilization. In some embodiments, the performance value compressor 143 can develop compressed representations of CPU utilization across a plurality of CPU cores. In some cases, the CPU cores can number in the hundreds or thousands on a given computer system. In some embodiments, the performance value compressor 143 can be a component of data collectors such as the data collectors 130. Example operation of the performance value compressor 143 will be described in relation to FIG. 3.

The reporting module 144 can generate regular or on-demand reports related to the monitoring data. In various cases, these reports can provide a snapshot of some or all of the monitored systems 120. The reporting module 144 typically accesses the monitoring data via the query module 146. The reporting module 144 can publish reports or other generated information, for example, to a web page, dashboard, and/or the like. For example, in some embodiments, the reporting module 144 can generate and/or cause to be displayed a visualization of data generated by the performance value compressor 143. The query module 146 can generate and execute a query of the central data store 150. In various cases, the query module 146 can be triggered by and work in conjunction with the reporting module 144.

The web page, user dashboard or other user interface(s) output, for example, by the reporting module 144, can be accessed by users of user systems 160. The query module 146 can also provide a user interface, for instance, that allows the users of the user systems 160 to obtain customized data related to any data maintained by the central data store 150. The user systems 160 can include any type of computing device, including information handling systems such as desktops, laptops, tablets, smartphones, PDAs, to name a few. The user systems 160 can be operated by users associated with the tenants or by other users.

Figure 2:
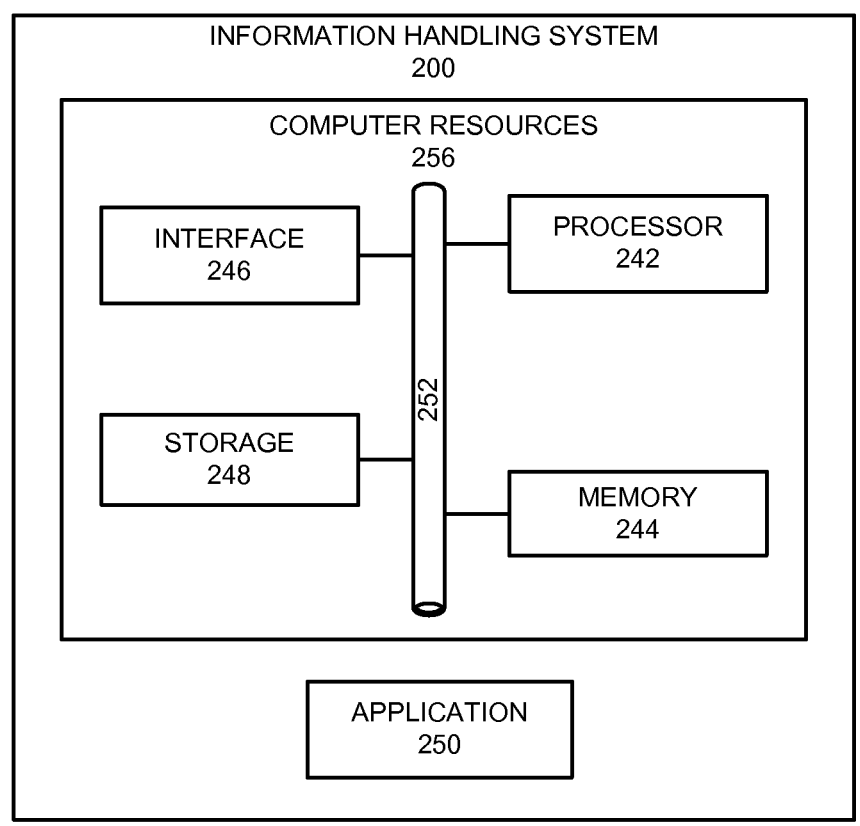
FIG. 2 illustrates an example of an information handling system.

FIG. 2 illustrates an example of an information handling system 200 that, in some cases, can be representative, for example, of the tenant systems 110, the monitored systems 120, the data collectors 130, the user systems 160 and/or the central analysis system 140 of FIG. 1. The information handling system 200 includes an application 250 operable to execute on computer resources 256. The application 250 can be similar, for example, to the data collection module 142, the performance value compressor 143, the reporting module 144, the query module 146 and, in some cases, the data collectors 130. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
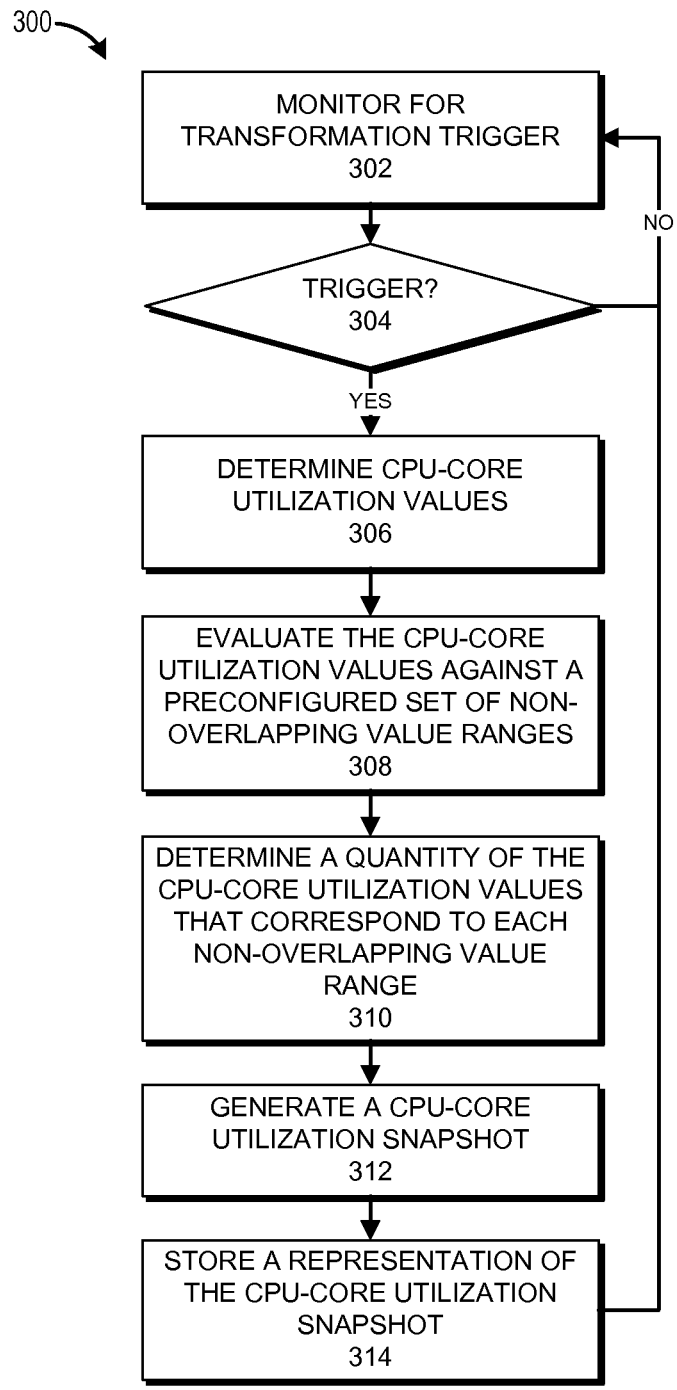
FIG. 3 illustrates an example of a process for developing a compressed representation of monitoring data using a compressed metric format.

FIG. 3 illustrates an example of a process 300 for developing a compressed representation of monitoring data using a compressed metric format such as the compressed value format 174 of FIG. 1. For example, the process 300, in whole or in part, can be implemented by one or more of the central analysis system 140, the data collection module 142, the performance value compressor 143, the reporting module 144, and/or the query module 146. The process 300 can also be performed generally by the computing environment 100. Although any number of systems, in whole or in part, can implement the process 300, to simplify discussion, the process 300 will be described in relation to specific systems or subsystems of the computing environment 100.

At block 302, the performance value compressor 143 monitors for a transformation trigger. In various embodiments, the performance value compressor 143 can be triggered at regular intervals to compress or summarize data related to the CPU cores of a particular computer system, the CPU cores of each computer system in the computing environment 100, etc. In some embodiments, the transformation trigger can be received from the data collection module 142, for example, as a result of new time-series data. In other embodiments, the transformation trigger can be a self-trigger within the performance value compressor 143, for example, as a result of a scheduled task or an expiration of a period of time. It should be appreciated that the transformation trigger can also be received in other ways from other computer systems or components.

At decision block 304, the performance value compressor 143 determines whether a transformation trigger has been received. If the performance value compressor 143 determines at decision block 304 that no transformation trigger has been received, the process 300 returns to block 302 and proceeds as described above. Otherwise, if the performance value compressor 143 determines at decision block 304 that a transformation trigger has been received, the process 300 proceeds to block 306.

At block 306, the performance value compressor 143 determines CPU-core utilization values for a plurality of CPU cores. In general, the plurality of CPU cores can be the CPU cores of a particular computer system. In an example, the CPU-core utilization values can be the current, or most recent, CPU-utilization rates of the plurality of CPU cores.

In a typical embodiment, the CPU-utilization rates can be part of the time-series data collected by the data collection module 142.

At block 308, the performance value compressor 143 evaluates the CPU-core utilization values determined at block 306 against a preconfigured set of non-overlapping value ranges. In certain embodiments, the preconfigured set of non-overlapping value ranges can be specified by the compressed value format 174 as described with respect to FIG. 1. In general, the block 308 can include determining which non-overlapping value range includes each of the CPU-core utilization values.

At block 310, the performance value compressor 143 determines a quantity of the CPU-core utilization values that correspond to each non-overlapping value range. Table 1 illustrates example quantities for a set of example value ranges with respect to an example computer system (or collection of computer systems) having one-hundred CPU cores.

TABLE 1

| VALUE RANGE | QUANTITY |
| --- | --- |
| VALUE = 0% | 15 cores |
| 0% < VALUE <= 20% | 45 cores |
| 20% < VALUE <= 80% | 30 cores |
| 80% < VALUE < 100% | 8 cores |
| VALUE = 100% | 2 cores |

At block 312, the performance value compressor 143 generates a CPU-core utilization snapshot. In various embodiments, the snapshot can be a representation of the quantities determined at block 310. For example, in some cases, the snapshot can be represented in an array or other abstract data type. In addition, in some embodiments, the snapshot can be a visualization of the quantities (e.g., a histogram). At block 314, the performance value compressor 143 can store the snapshot, or a representation thereof, in the central data store 150 or other memory.

Figure 4:
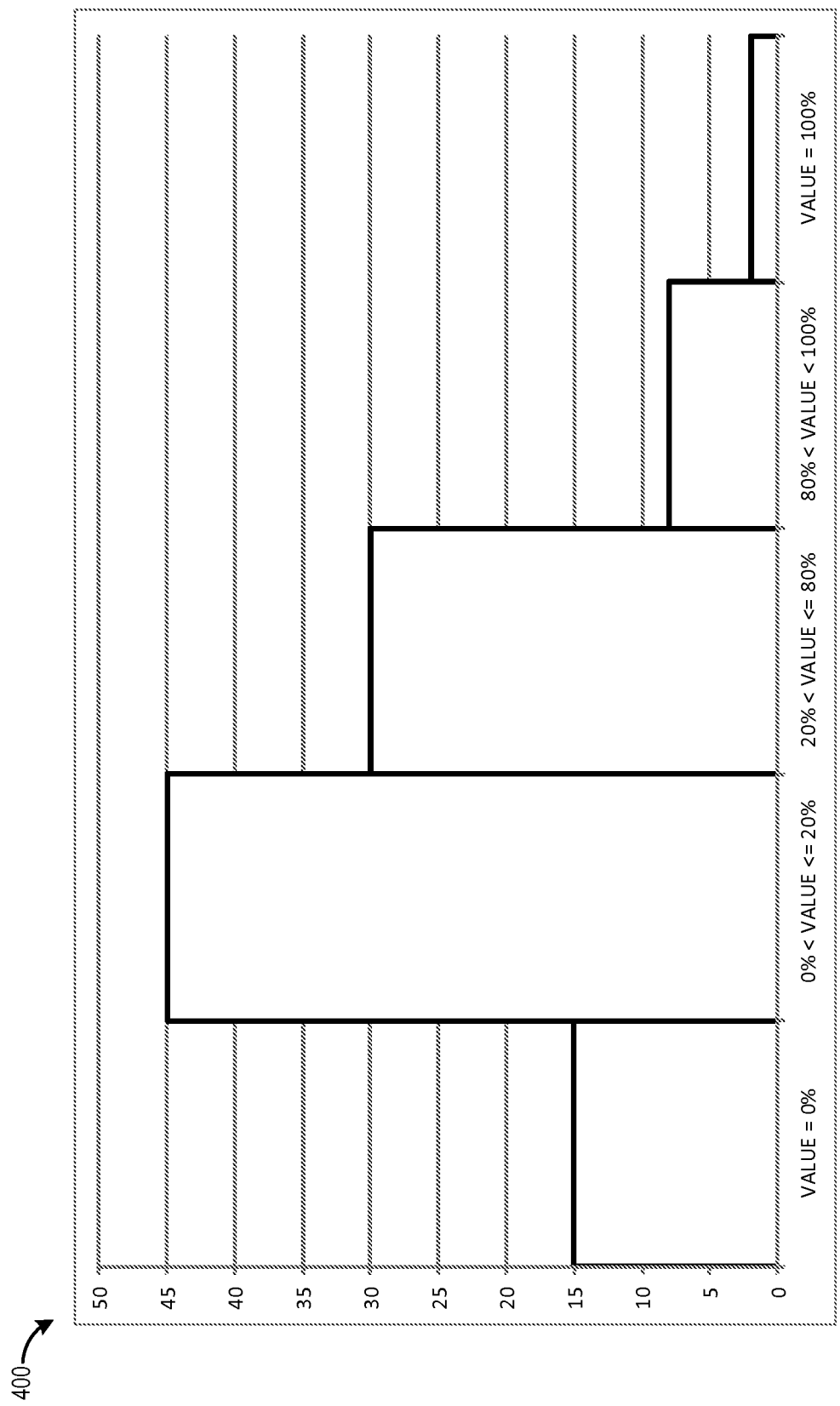
FIG. 4 illustrates an example of a visualization.

FIG. 4 illustrates an example of a visualization 400 that can be generated by the performance value compressor 143, the reporting module 144 or another component. In the illustrated embodiment, the visualization 400 is a histogram of the example data shown in Table 1 above. In certain embodiments, the visualization 400 can be displayed or caused to be displayed by the reporting module 144 of FIG. 1.

In certain embodiments, an analysis system such as the central analysis system 140 of FIG. 1 can exclusively track CPU utilization on a system using a compressed value format such as the compressed value format 174 of FIG. 1. In various embodiments, numerous performance advantages can result from the principles described above.

For example, in certain embodiments, the compressed value format 174 can conserve resources of the central analysis system 140. In a typical embodiment, operating systems automatically attempt to balance load across CPU cores, for example, as context switches occur. In these embodiments, the central analysis system 140 does not typically have a need to know which specific CPU core corresponds to which specific CPU-utilization value. Thus, in certain embodiments, the central analysis system 140 can omit storage of historical time-series metrics (e.g., CPU-core utilization values) of each CPU core. Rather, CPU-core utilization snapshots such as the snapshot generated at block 312 of FIG. 3 can provide sufficient detail for monitoring and analysis at a significant computational and storage savings. In these embodiments, infrastructure monitoring and alerts can occur with respect to the CPU-utilization snapshots. Further, computational and storage efficiency can be achieved by the central analysis system 140 not maintaining a historical record of each time-series metric of each CPU core. CPU-core utilization snapshots such as the snapshot generated at block 312 of FIG. 3 can be considered a compressed version of, and a replacement for, the time-series data.

In various embodiments, the computational and storage savings of a compressed value format such as the compressed value format 174 can become more significant as the number of monitored systems (and components thereof) increases. It should be appreciated that, when the compressed value format 174 is applied across the computing environment 100, the central analysis system 140 can omit storage of time-series data for which there is a compressed value format represented by the compressed value format 174.

Further, network performance can be improved, for example, by data collectors and other components transmitting compressed versions of performance values according to the compressed value format 174 instead of the CPU-core utilization values of each CPU core. For example, in certain embodiments, the reporting module 144 can service requests for CPU-core utilization values. In some of these embodiments, the reporting module 144 can respond with data according to the compressed value format 174, thus preserving network resources. In an example, the reporting module 144 can retrieve a representation of a CPU-core utilization snapshot and publish the snapshot to a requestor. In some cases, the reporting module 144 can cause a visualization of the CPU-core utilization snapshot to be displayed as described in relation to FIG. 4.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
   receiving and monitoring, in real-time, time-series data related to individual utilization rates of a plurality of central processing unit (CPU) cores;
   responsive to a trigger, transforming at least a portion of the individual utilization rates into a compressed value format that excludes identification of the plurality of CPU cores, wherein the compressed value format defines a preconfigured set of non-overlapping value ranges for CPU-core utilization rates, and wherein the transforming comprises:
      determining, from at least a portion of the time-series data, CPU-core utilization values of the plurality of CPU cores for a time constraint;
      evaluating the CPU-core utilization values against the preconfigured set of non-overlapping value ranges for CPU-core utilization rates, the evaluating comprising determining, for each CPU-core utilization value of the CPU-core utilization values, which non-overlapping value range of the preconfigured set of non-overlapping value ranges includes the CPU-core utilization value;
      responsive to the evaluating, determining a quantity of the CPU-core utilization values that correspond to each non-overlapping value range of the preconfigured set of non-overlapping value ranges;
      wherein, for each non-overlapping value range of the preconfigured set of non-overlapping value ranges, the determined quantity represents a total number of the plurality of CPU cores for which the CPU-core utilization values are included by the non-overlapping value range; and
      generating a CPU-core utilization snapshot comprising the determined quantity of each non-overlapping value range of the preconfigured set of non-overlapping value ranges, wherein the CPU-core utilization snapshot excludes identification of which specific CPU cores of the plurality of CPU cores correspond to which non-overlapping value range of the preconfigured set of non-overlapping value ranges; and
   storing information related to the CPU-core utilization snapshot in a data store in place of the time-series data related to individual utilization rates, thereby conserving resources of the computer system.

2. The method of claim 1, comprising causing the transforming to repeated at regular intervals in relation to then-current time-series data.

3. The method of claim 1, comprising storing a representation of the CPU-core utilization snapshot.

4. The method of claim 3, comprising, responsive to a context switch, balancing load across the plurality of CPU cores using the stored information related to the CPU-core utilization snapshot.

5. The method of claim 3, comprising:
   receiving a request for at least a portion of the CPU-core utilization values;
   retrieving the representation of the CPU-core utilization snapshot; and
   publishing the representation to a requestor.

6. The method of claim 1, the method comprising performing infrastructure monitoring in relation to the CPU-core utilization snapshot.

7. The method of claim 1, comprising:
   generating a visualization of the CPU-core utilization snapshot; and
   causing the visualization to be displayed.

8. An information handling system comprising a processor, wherein the processor is operable to implement a method comprising:
   receiving and monitoring, in real-time, time-series data related to individual utilization rates of a plurality of central processing unit (CPU) cores;
   responsive to a trigger, transforming at least a portion of the individual utilization rates into a compressed value format that excludes identification of the plurality of CPU cores, wherein the compressed value format defines a preconfigured set of non-overlapping value ranges for CPU-core utilization rates, and wherein the transforming comprises:
      determining, from at least a portion of the time-series data, CPU-core utilization values of the plurality of CPU cores for a time constraint;
      evaluating the CPU-core utilization values against a preconfigured set of non-overlapping value ranges for CPU-core utilization rates, the evaluating comprising determining, for each CPU-core utilization value of the CPU-core utilization values, which non-overlapping value range of the preconfigured set of non-overlapping value ranges includes the CPU-core utilization value;
      responsive to the evaluating, determining a quantity of the CPU-core utilization values that correspond to each non-overlapping value range of the preconfigured set of non-overlapping value ranges;
      wherein, for each non-overlapping value range of the preconfigured set of non-overlapping value ranges, the determined quantity represents a total number of the plurality of CPU cores for which the CPU-core utilization values are included by the non-overlapping value range; and
      generating a CPU-core utilization snapshot comprising the determined quantity of each non-overlapping value range of the preconfigured set of non-overlapping value ranges, wherein the CPU-core utilization snapshot excludes identification of which specific CPU cores of the plurality of CPU cores correspond to which non-overlapping value range of the preconfigured set of non-overlapping value ranges; and
   storing information related to the CPU-core utilization snapshot in a data store in place of the time-series data related to individual utilization rates, thereby conserving resources of the information handling system.

9. The information handling system of claim 8, the method comprising causing the transforming to repeated at regular intervals in relation to then-current time-series data.

10. The information handling system of claim 8, the method comprising storing a representation of the CPU-core utilization snapshot.

11. The information handling system of claim 10, the method comprising, responsive to a context switch, balancing load across the plurality of CPU cores using the stored information related to the CPU-core utilization snapshot.

12. The information handling system of claim 10, the method comprising:
   receiving a request for at least a portion of the CPU-core utilization values;

retrieving the representation of the CPU-core utilization snapshot; and publishing the representation to a requestor.

13. The information handling system of claim 8, the method comprising performing infrastructure monitoring in relation to the CPU-core utilization snapshot.

14. The information handling system of claim 8, the method comprising:

generating a visualization of the CPU-core utilization snapshot; and causing the visualization to be displayed.

15. A computer-program product comprising a non-transitory computer-usable medium having computer-readable program code embodied therein, the computer-readable program code adapted to be executed to implement a method comprising:

receiving and monitoring, in real-time, time-series data related to individual utilization rates of a plurality of central processing unit (CPU) cores;

responsive to a trigger, transforming at least a portion of the individual utilization rates into a compressed value format that excludes identification of the plurality of CPU cores, wherein the compressed value format defines a preconfigured set of non-overlapping value ranges for CPU-core utilization rates, and wherein the transforming comprises:

determining, from at least a portion of the time-series data, CPU-core utilization values of the plurality of CPU cores for a time constraint;

evaluating the CPU-core utilization values against the preconfigured set of non-overlapping value ranges for CPU-core utilization rates, the evaluating comprising determining, for each CPU-core utilization value of the CPU-core utilization values, which non-overlapping value range of the preconfigured set of non-overlapping value ranges includes the CPU-core utilization value;

responsive to the evaluating, determining a quantity of the CPU-core utilization values that correspond to each non-overlapping value range of the preconfigured set of non-overlapping value ranges;

wherein, for each non-overlapping value range of the preconfigured set of non-overlapping value ranges, the determined quantity represents a total number of the plurality of CPU cores for which the CPU-core utilization values are included by the non-overlapping value range; and generating a CPU-core utilization snapshot comprising the determined quantity of each non-overlapping value range of the preconfigured set of non-overlapping value ranges, wherein the CPU-core utilization snapshot excludes identification of which specific CPU cores of the plurality of CPU cores correspond to which non-overlapping value range of the preconfigured set of non-overlapping value ranges; and storing information related to the CPU-core utilization snapshot in a data store in place of the time-series data related to individual utilization rates, thereby conserving resources of a computer system.

16. The computer-program product of claim 15, the method comprising causing the transforming to repeated at regular intervals in relation to then-current time-series data.

17. The computer-program product of claim 15, the method comprising storing a representation of the CPU-core utilization snapshot.

18. The computer-program product of claim 17, the method comprising, responsive to a context switch, balancing load across the plurality of CPU cores using the stored information related to the CPU-core utilization snapshot.

19. The computer-program product of claim 17, the method comprising:

receiving a request for at least a portion of the CPU-core utilization values;

retrieving the representation of the CPU-core utilization snapshot; and publishing the representation to a requestor.

20. The computer-program product of claim 15, the method comprising performing infrastructure monitoring in relation to the CPU-core utilization snapshot.

\* \* \* \* \*